United States Patent Office 3,446,816
Patented May 27, 1969

3,446,816
SUBSTITUTED IMIDAZOLIDINONES AND
IMIDAZOLIDINETHIONES
William Blythe Wright, Jr., Woodcliff Lake, N.J., and
Herbert Joseph Brabander, Nanuet, N.Y., assignors to
American Cyanamid Company, Stamford, Conn., a
corporation of Maine
No Drawing. Continuation-in-part of application Ser. No.
457,811, May 21, 1965. This application July 21, 1967,
Ser. No. 654,955
Int. Cl. C07d 57/00; A61k 27/00
U.S. Cl. 260—309.7                             10 Claims

ABSTRACT OF THE DISCLOSURE

The preparation of 1-[(3-azabicyclo[3.2.2]nonan-3-yl)alkyl]-3-aryl-2-imidazolidinones and imidazolidinethiones are described, which are novel compounds. These compounds are useful as tranquilizers.

The present application is a continuation-in-part of our application Ser. No. 457,811 filed May 21, 1965, now abandoned.

We have found that compounds having the following structure are highly active physiologically:

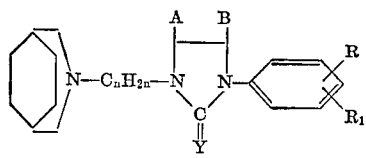

wherein R is selected from the group consisting of hydrogen, halogen and lower alkyl; $R_1$ is selected from the group consisting of hydrogen, halogen, lower alkyl, lower alkoxy and trifluoromethyl; Y is selected from the group consisting of oxygen and sulfur; $n$ is an integer from 2 to 4; A and B are selected from the group consisting of hydrogen and lower alkyl and the pharmaceutically acceptable acid addition salts of the above compounds.

The compounds of the present invention may be solids or liquids at room temperature in the form of their free bases. As such, they are relatively insoluble in water but are soluble in or miscible with most organic solvents such as, for example, lower alkyl alcohols, esters, acetone, chloroform and the like. These compounds form acid addition salts with strong acids such as hydrochloric acid, sulfuric acid, perchloric acid and the like. These salts are, in general, soluble in water, methanol, ethanol, etc. but relatively insoluble in benzene, ether, petroleum-ether and the like.

The compounds of this invention may be prepared by the following method which has been found most desirable.

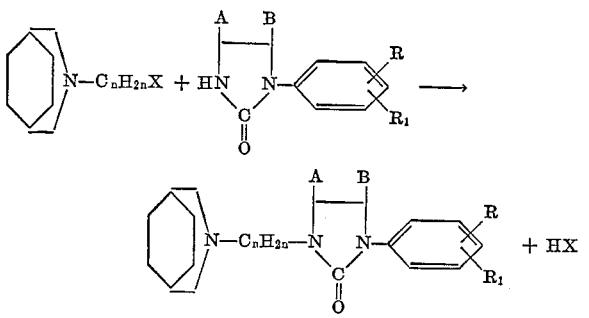

wherein R, $R_1$, A, B and $n$ are as defined above and X is a reactive halogen or an arylsulfonyloxy radical. The substituted imidazolidinone starting material is dissolved in an inert solvent such as, for example, diethyleneglycol dimethylether (diglyme) and reacted with a condensing agent such as sodium hydride and then with an appropriate aminoalkyl halide. The reaction is best carried out at temperatures in the range of 30°–200° C. for a period of from 30 minutes to 4 hours. The product can be recovered by methods well known in the art and described hereinafter in the examples. A further method for preparing the compounds of the present invention can be illustrated as follows:

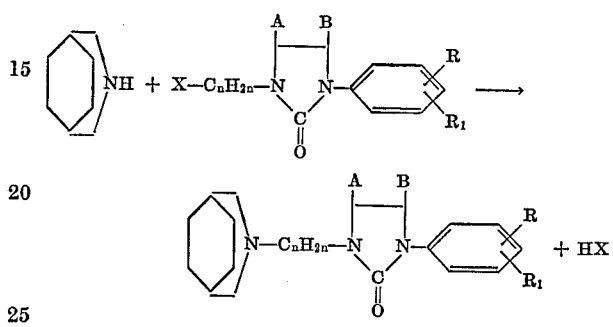

wherein R, $R_1$, A, B, and $n$ are as defined above and X is a reactive halogen or an arylsulfonyloxy radical. The reaction conditions do not appear to be critical. The alkylating agent (containing X) is reacted with the amine in excess or in the presence of an acid acceptor such as sodium or potassium carbonate, sodium hydroxide, pyridine and the like. The reaction is preferably carried out in the presence of an excess of the amine or in a solvent such as benzene, toluene, ethanol, acetone and the like. The reaction is best carried out within the range of about 20° C. to about 150° C. for a period of from about 30 minutes to several hours. The product can be recovered by methods well known in the art and as described hereinafter in the examples.

The corresponding imidazolidinethiones are also a part of this invention and in some cases they can be prepared by processes similar to those described above. It is, however preferable to prepare these compounds by special procedures, such as by the reaction of the imidazolidinone with phosphorus pentasulfide as described hereinafter in the examples.

The compounds of the present invention show CNS depressant properties. This activity is indicated by several procedures. For example, a test which indicates hypnotic and/or muscle relaxant type activity is represented by the following rod walking test. Groups of 6 mice each are tested for their ability to walk across a horizontal rod in a normal manner after receiving graded intraperitoneal doses of a compound. A median effective dose (RWD) is estimated. A test which indicates tranquilizing activity is represented by a measure of the reduction in motor activity. One-half this dose is given to a group of 5 mice and a 5 minute count of motor activity is recorded (actophotometer). Counts of $\leq 250$ are considered to indicate a specific reduction (more than two standard deviations) of activity at a dose causing only minimal impairment of neurological function as measured by rod walking ability. Compounds that appeared to reduce motor activity ($\leq 250$ count) are administered to additional groups of 5 mice at graded doses and tested similarly. The dose (MDD) which causes a 50% reduction of motor activity (a count of 250) is estimated.

The following table summarizes the activity of representative compounds of the present invention when tested by the above procedure.

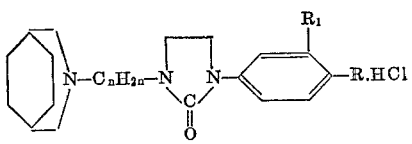

| R | R₁ | n | MDD₅₀ | RWD₅₀ |
|---|---|---|---|---|
| H | H | 2 | 24 | 48 |
| H | Cl | 2 | 32 | 100 |
| H | Br | 2 | 20 | 120 |
| CH₃ | Cl | 2 | 21 | 280 |
| H | OCH₃ | 2 | 21 | 50 |
| H | Cl | 3 | 6 | 10 |

The products of the present invention as tranquilizers can be incorporated in various pharmaceutical forms such as tablets, capsules, pills and so forth, for immediate or sustained release, by combining the suitable carriers. They may be in the form of dosage units for a single therapeutic dose or in small units for multiple dosages or in larger units for division into single doses. Obviously, in addition to the therapeutic tranquilizing compounds there may be present excipients, binders, fillers and other therapeutically inert ingredients necessary in the formulation of the desired pharmaceutical preparation.

EXAMPLE 1

Preparation of 1-[2-(3-azabicyclo[3.2.2]nonan-3-yl) ethyl]-3-(m-chlorophenyl)-2-imidazolidinone A solution of 7.3 parts of 1-(m-chlorophenyl)-2-imidazolidinone in 125 parts of diglyme is added dropwise to 2 parts of 50% sodium hydride (in mineral oil) in 25 parts of diglyme. The reaction mixture is stirred for one hour and a solution of 8.5 parts of 2-(3-azabicyclo[3.2.2] nonan-3-yl)ethyl chloride in 100 parts of ether is added. The mixture is stirred for 30 minutes, gradually warmed to distill off the ether and heated at reflux temperature for 5 hours. After cooling, the insoluble material is filtered off and the mother liquor is concentrated to a crystalline residue. This is dissolved in benzene and twice extracted with water. The water layer is discarded. The benzene layer is shaken with 1 N hydrochloric acid and the benzene layer is discarded. The aqueous layer, which contains crystalline product, is treated with sodium hydroxide and extracted with benzene. The benzene layer is concentrated and the residue is recrystallized from benzene and hexane. The 1-[2-(3-azabicyclo[3.2.2]nonan-3-yl)ethyl] - 3-(m-chlorophenyl)-2-imidazolidinone melts at 104°–105° C. The hydrochloride is prepared by adding ethanolic hydrogen chloride to a solution of the base in ethanol and melts at 273°–276° C.

EXAMPLE 2

Preparation of 1-[3-(3-azabicyclo[3.2.2]nonan-3-yl) propyl]-3-(m-chlorophenyl)-2-imidazolidinone A solution of 12.3 parts of 1-(m-chlorophenyl)-2-imidazolidinone in 80 parts of diglyme is added dropwise to 3.8 parts of 50% sodium hydride (in mineral oil) in 35 parts of diglyme. The reaction mixture is stirred for an hour, 13 parts by volume of 1,3-dibromopropane is added, and the mixture is stirred at room temperature for 18 hours longer. The insoluble material is filtered off and washed with ether. The filtrate is concentrated to remove the ether and diglyme, the residue is dissolved in 35 parts of benzene, and 15.1 parts of 3-azabicyclo[3.2.2]nonane are added. The reaction mixture is heated at reflux temperature for 18 hours and cooled. Benzene (100 parts) is added and the solution is washed twice with sodium carbonate solution and then with water. The benzene layer is shaken with 40 ml. of 5 N hydrochloric acid and a precipitate separates. The mixture is filtered and the precipitate is recrystallized twice from ethanol. The 1-[3-(3-azabicyclo[3.2.2]nonan - 3 - yl)propyl] - 3-(m-chlorophenyl)-2-imidazolidinone hydrochloride melts at 265°–268° C.

EXAMPLE 3

Preparation of 1-[2-3-(azabicyclo[3.2.2]nonan-3-yl) ethyl]-3-(m-bromophenyl)-2-imidazolidinone The above compound is obtained when 1-(m-bromophenyl)-2-imidazolidinone is substituted for 1-(m-chlorophenyl)-2-imidazolidinone in the procedure of Example 1. The hydrochloride salt melts at 273°–276° C.

EXAMPLE 4

Preparation of 1-[2-(3-azabicyclo[3.2.2]nonan-3-yl) ethyl]-3-(o-fluorophenyl)-2-imidazolidinone When 1-(o-fluorophenyl)-2-imidazolidinone is substituted for 1-(m-chlorophenyl)-2-imidazolidinone in the procedure of Example 1, the above compound is obtained.

EXAMPLE 5

Preparation of 1-[2-(3-azabicyclo[3.2.2]nonan-3-yl) ethyl]-3-(m-methoxyphenyl)-2-imidazolidinone This compound is obtained when 1 - (m - methoxyphenyl)-2-imidazolidinone is used in place of 1-(m-chlorophenyl)-imidazolidinone in the procedure of Example 1. The hydrochloride melts at 259°–262° C.

EXAMPLE 6

Preparation of 1-[2-(3-azabicyclo[3.2.2]nonan-3-yl) ethyl]-3-(m-trifluoromethylphenyl)-2-imidazolidinone When 1-(m - trifluoromethylphenyl)-2-imidazolidinone is substituted for 1-(m-chlorophenyl)-2-imidazolidinone in the procedure of Example 1, the above compound is obtained.

EXAMPLE 7

Preparation of 1-[2-(3-azabicyclo[3.2.2]nonan-3-yl) ethyl]-3-(m-chlorophenyl)-4-methyl-2-imidazolidinone The above compound is obtained when 1-(m-chlorophenyl)-5-methyl-2-imidazolidinone is substituted for 1-(m-chlorophenyl)-2-imidazolidinone in the procedure of Example 1.

EXAMPLE 8

Preparation of 1-[2-(3-azabicyclo[3.2.2]nonan-3-yl) ethyl]-3-(m-chlorophenyl)-5-methyl-2-imidazolidinone When 1-(m-chlorophenyl)-4-methyl-2-imidazolidinone is used in place of 1-(m-chlorophenyl)-2-imidazolidinone in the procedure of Example 1, the above compound is obtained.

EXAMPLE 9

Preparation of 1-[2-(3-azabicyclo[3.2.2]nonan-3-yl) ethyl]-3-(3-chloro-4-methylphenyl)-2-imidazolidinone The above compound is obtained when 1-(m-chloromethylphenyl)-2-imidazolidinone is used in place of 1-(m-chlorophenyl)-2-imidazolidinone in the procedure of Example 1. The hydrochloride melts at 290°–293° C.

EXAMPLE 10

Preparation of 1-[2-(3-azabicyclo[3.2.2]nonan-3-yl) ethyl]-3-(3,5-dichlorophenyl)-2-imidazolidinone When 1 - (m - chlorophenyl) - 2-imidazolidinone is replaced by 1-(3,5-dichlorophenyl)-2-imidazolidinone in the procedure of Example 1, the above compound is obtained.

EXAMPLE 11

Preparation of 1-[4-(3-azabicyclo[3.2.2]nonan-3-yl) butyl]-3-(m-chlorophenyl)-2-imidazolidinone The above compound is obtained when 4-(3-azabicyclo[3.2.2]nonan-3-yl)butyl chloride is substituted for 2-(3-azabicyclo[3.2.2]nonan-3-yl)ethyl chloride in the procedure of Example 1.

EXAMPLE 12

Preparation of 1-[2-(3-azabicyclo[3.2.2]nonan-3-yl) ethyl]-3-phenyl-2-imidazolidinone hydrochloride A mixture of 3.8 parts of 1-[2-(3-azabicyclo[3.2.2] nonan - 3 - yl)ethyl]-3-(m-chlorophenyl)-2-imidazolidinone hydrochloride, 150 parts of 85% ethanol and 1 part of 10% palladium-on-carbon catalyst is shaken in a Parr hydrogenator under about 45 pounds of hydrogen pressure until hydrogen is no longer absorbed. The reaction mixture is filtered and the mother liquor is concentrated to remove the solvent. The crystalline residue is twice recrystallized from ethanol. The 1-[2-(3-azabicyclo[3.2.2] nonan-3-yl)ethyl]-3-phenyl-2-imidazolidinone hydrochloride melts at 267°–269° C.

EXAMPLE 13

Preparation of 1-[3-(3-azabicyclo[3.2.2]nonan-3-yl) propyl]-3-phenyl-2-imidazolidinone hydrochloride The above compound, melting point 275°–277° C., is obtained when 1-[3-(3-azabicyclo[3.2.2]nonan-3-yl) propyl]-3-(m-chlorophenyl)-2-imidazolidinone hydrochloride is reduced by the procedure of Example 12.

EXAMPLE 14

Preparation of 1-[2-(3-azabicyclo[3.2.2]nonan-3-yl) ethyl]-3-(m-chlorophenyl)-2-imidazolidinethione A mixture of 25 parts of 1-[2-(3-azabicyclo[3.2.2]nonan-3-yl)ethyl]-3-(m-chlorophenyl)-2-imidazolidinone hydrochloride (Example 1) and 25 parts of phosphorus pentasulfide in 100 parts of xylene is heated in an oil bath temperature of 155°–160° C. for 28 hours. The mixture is cooled and 350 parts of 2 N sodium hydroxide and 200 parts of benzene are added. The layers are separated after gently warming to dissolve the gummy residue. The organic layers are washed with two portions of water and the product is then extracted into 250 parts of 1 N hydrochloric acid. The acid layer is washed with ether and then made alkaline with 5 N sodium hydroxide. The 1-[2-(3-azabicyclo[3.2.2]nonan-3-yl)ethyl]-3-(m-chlorophenyl)-2-imidazolidinethione is extracted into ether and recovered by concentration of the ether layer.

We claim:

1. An azabicyclo compound selected from those of the formula:

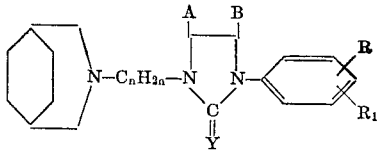

wherein R is selected from the group consisting of hydrogen, halogen and lower alkyl; $R_1$ is selected from the group consisting of hydrogen, halogen, lower alkyl, lower alkoxy and trifluoromethyl; Y is selected from the group consisting of oxygen and sulfur; $n$ is an integer from 2 to 4; A and B are selected from the group consisting of hydrogen and lower alkyl and a pharmaceutically acceptable acid addition salt.

2. The compound according to claim 1, wherein the azabicyclo compound is 1-[2-(3-azabicyclo[3.2.2]nonan-3-yl)ethyl]-3-(m-chlorophenyl)-2-imidazolidinone.

3. The compound according to claim 1, wherein the azabicyclo compound is 1-[3-(3-azabicyclo[3.2.2]nonan-3-yl)-propyl]-3-(m-chlorophenyl)-2-imidazolidinone.

4. The compound according to claim 1, wherein the azabicyclo compound is 1-[2-(3-azabicyclo[3.2.2]nonan-3-yl)-ethyl]-3-(m-bromophenyl)-2-imidazolidinone.

5. The compound according to claim 1, wherein the azabicyclo compound is 1-[2-(3-azabicyclo[3.2.2]nonan-3-yl)ethyl]-3-(m-methoxyphenyl)-2-imidazolidinone.

6. The compound according to claim 1, wherein the azabicyclo compound is 1-[2-(3-azabicyclo[3.2.2]nonan-3 - yl)ethyl]-3-(m-trifluoromethylphenyl)-2-imidazolidinone.

7. The compound according to claim 1, wherein the azabicyclo compound is 1-[2-(3-azabicyclo[3.2.2]nonan-3 - yl)ethyl]-3-(m-chlorophenyl)-4-methyl-2-imidazolidinone.

8. The compound according to claim 1, wherein the azabicyclo compound is 1-[2-(3-azabicyclo[3.2.2]nonan-3 - yl)ethyl]-3-(m-chlorophenyl)-5-methyl-2-imidazolidinone.

9. The compound according to claim 1, wherein the azabicyclo compound is 1-[2-(3-azabicyclo[3.2.2]nonan-3 - yl)ethyl]-3-(3-chloro-4-methylphenyl)-2-imidazolidinone.

10. The compound according to claim 1, wherein the azabicyclo compound is 1-[2-(3-azabicyclo[3.2.2]nonan-3-yl)ethyl]-3-phenyl-2-imidazolidinone hydrochloride.

References Cited

UNITED STATES PATENTS

| 3,196,152 | 7/1965 | Wright et al. | 260—309.7 |
| 3,252,927 | 5/1966 | Mull. | |
| 3,334,115 | 8/1967 | Arnold et al. | 260—309.7 |

FOREIGN PATENTS

| 1,019,462 | 2/1966 | Great Britain. |

HENRY R. JILES, *Primary Examiner.*

N. TROUSOF, *Assistant Examiner.*

U.S. Cl. X.R.

260—239, 999